US006988910B2

(12) United States Patent  
Gartrell

(10) Patent No.: US 6,988,910 B2
(45) Date of Patent: Jan. 24, 2006

(54) HANDLE ACCESSORY FOR A MOBILE STATION AND METHOD OF USING THE SAME

(75) Inventor: Andrew Julian Gartrell, Tarzana, CA (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/822,959

(22) Filed: Apr. 13, 2004

(65) Prior Publication Data

US 2005/0227533 A1    Oct. 13, 2005

(51) Int. Cl.
*H01R 13/20*    (2006.01)
(52) U.S. Cl. .................. 439/527; 361/176; 361/683
(58) Field of Classification Search ............... 439/527; 341/176, 683
See application file for complete search history.

(56) References Cited

U.S. PATENT DOCUMENTS

| | | | | |
|---|---|---|---|---|
| 5,002,184 A | * | 3/1991 | Lloyd | .......................... 206/305 |
| 5,134,245 A | * | 7/1992 | Katz | .......................... 174/35 R |
| 5,220,319 A | * | 6/1993 | Kendel | .................. 340/825.69 |
| 6,028,765 A | * | 2/2000 | Swindler et al. | ............ 361/683 |
| 6,249,684 B1 | | 6/2001 | Hasegawa | |
| 6,427,959 B1 | * | 8/2002 | Kalis et al. | ............ 248/288.11 |
| 6,703,962 B1 | * | 3/2004 | Marics et al. | ................ 341/176 |
| 6,781,825 B2 | * | 8/2004 | Shih et al. | .................. 361/683 |

OTHER PUBLICATIONS www.gamestech.com, Handheld Console document as an examiner's attachment.*

* cited by examiner

*Primary Examiner*—Truc Nguyen
(74) *Attorney, Agent, or Firm*—Alston & Bird LLP

(57) ABSTRACT

The present invention addresses the above needs and achieves other advantages by providing a mobile station of the present invention. The mobile station includes a wireless telecommunications signal processing assembly contained within a housing. In addition, the mobile station includes a grip flange that has a peripheral edge extending around the housing so that the housing is contained within the peripheral edge. A body of the grip flange is attached to at least one portion of the housing, allowing the grip flange to be easily gripped by the user for carrying the mobile station. The grip flange may also include an inner edge that defines an opening in which the housing is positioned wherein portions of the inner edge are spaced from the housing to allow the user to grip the flange with a closed grasp. Also, the housing may be positioned so that two opposite portions of the inner edge are spaced from the housing and the portions of the grip flange thereat can be bent towards each other to form an armband or a handbag-style handle.

21 Claims, 13 Drawing Sheets

HANDLE ACCESSORY FOR A MOBILE STATION AND METHOD OF USING THE SAME

BACKGROUND

The present invention is related to the use of accessories to improve the transportability and aesthetic appearance of mobile stations, and is more particularly directed to the use of handles or tethers for mobile stations.

Description of Related Art

Participants in the mobile telephone industry are in a constant search to differentiate their telephones by making them easier to use and more aesthetically appealing. For example, tethers have been developed that are comprised of short cords forming a loop having a free end and an opposite end fixed to the mobile telephone. In this manner, the loop can be opened to receive a wrist, allowing the tether and phone to be worn as a bracelet. Alternatively, the free end of the tether can be grasped to facilitate transport of the mobile telephone.

In another example, U.S. Pat. No. 6,249,684 to Hasegawa ("Hasegawa") discloses an ergonomic handle 18 for a wireless telephone 14. The handle includes a convex outer surface 32 and an inner surface 30 with rounded and concave portions, as shown in FIG. 4 of Hasegawa. Overall, the handle has an elongate rectangular shape with a width W that is more narrow than its length. At one end the handle is attached to, and extends from, a swivel portion 33 allowing the other end of the handle to rotate about the axis B—B with respect to the telephone.

When rotated outwards, away from a keypad 19 of the telephone, the handle extends downwards from the bottom of the telephone to the other end that is coplanar with the telephone. As is shown in FIGS. 2 and 3 of Hasegawa, the handle can then be gripped by the user in a single hand to place the telephone at their ear and mouth. Ostensibly, the handle allows the user to position the phone proximate the ear and mouth without the hand getting in the way. Also, Hasegawa describes the shape of the handle as being ergonomic and relieving biomechanical stresses due to flexion of the wrist.

Despite the advantages of the above-listed devices, further improvements in the aesthetic appearance, ease of use and transportability of mobile stations are always desirable. Therefore, it would be advantageous to have a handle for a mobile station that provides for easy gripping and transport of the mobile station, while improving the aesthetic appearance of the mobile station.

SUMMARY

The present invention addresses the above needs and achieves other advantages by providing a mobile station and grip flange. The grip flange has a peripheral edge extending around the housing of the mobile station so that at least a portion of the housing is contained within the peripheral edge. A body of the grip flange is attached to at least one portion of the housing, allowing the grip flange to be easily gripped by the user for carrying the mobile station. The grip flange may also include an inner edge that defines an opening in which the housing is positioned wherein portions of the inner edge are spaced from the housing to allow the user to grip the flange with a closed grasp. Also, the housing may be positioned so that two opposite portions of the inner edge are spaced from the housing and the portions of the grip flange thereat can be bent towards each other to form an armband or a handbag-style handle.

In one embodiment, the present invention includes a mobile station assembly having a mobile station and a grip flange. The mobile station includes a signal processing assembly and a housing. The signal processing assembly is contained within the housing and is capable of receiving and generating wireless telecommunications signals. A peripheral edge of the grip flange extends around the housing and a body of the grip flange is attached to at least one portion of the housing. In this manner, the housing is contained within the peripheral edge and the grip flange may be used as a handle for carrying the remaining portions of the mobile station. The grip flange may also include an inner edge defining an opening wherein the housing is positioned within the opening.

In another aspect, opposite portions of the inner edge of the grip flange may be spaced from the housing so that the opening defined by the inner edge is divided into two portions separated by the housing. For instance, opposite surfaces of the housing may extend over the inner edge to attach to opposite portions of the body of the grip flange. Advantageously, if the grip flange is constructed of a flexible material, the opposite portions of the inner edge (and the other portions of the grip flange in the vicinity of the opposite inner edge portions) that are spaced from the housing may be bent towards each other to form a handbag-style handle.

As another option, the housing may include at least two components that form a seam between each other. The grip flange extends between the two components within the seam for its attachment to the housing. In particular, the inner edge of the grip flange and a portion of the body of the grip flange may be trapped between the two components of the housing.

In another embodiment, the body portion of the grip flange extends between the peripheral edge and over a surface of the housing. For instance, the body portion may include a concave portion that extends over a front surface of the mobile station housing which defines openings for a keypad and display of the mobile station. A membranous material may be used to construct the concave portion so as to allow depression of the keys positioned below the concave portion. In another aspect, the membrane may serve as an audio amplification device for the mobile station. In still another aspect, the membrane may be impermeable to liquids allowing the mobile station to float.

Advantageously, the grip flange may have a range of different shapes so as to provide easy gripping, impact protection and stylization for the mobile station. For instance, the grip flange may have a simple shape, such as a circle or square, or a more complex shape, such as a shape with multiple lobes for gripping.

The grip flange and mobile station assembly of the present invention has many advantages. For instance, the grip flange provides a surface that extends around the mobile station and allows for easy gripping, impact protection, tethering to clothing or tossing and catching the mobile station. Additionally, the flexibility of the grip flange allows it to be bent into different shapes, such as an armband or handbag style grip. The optional concave portion provides even further gripping surface and also may allow the assembly to float, imbue it with aerodynamic properties or amplify sounds. Further, the grip flange is easily exchangeable with other grip flanges having different colors and shapes for customization of the mobile station.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
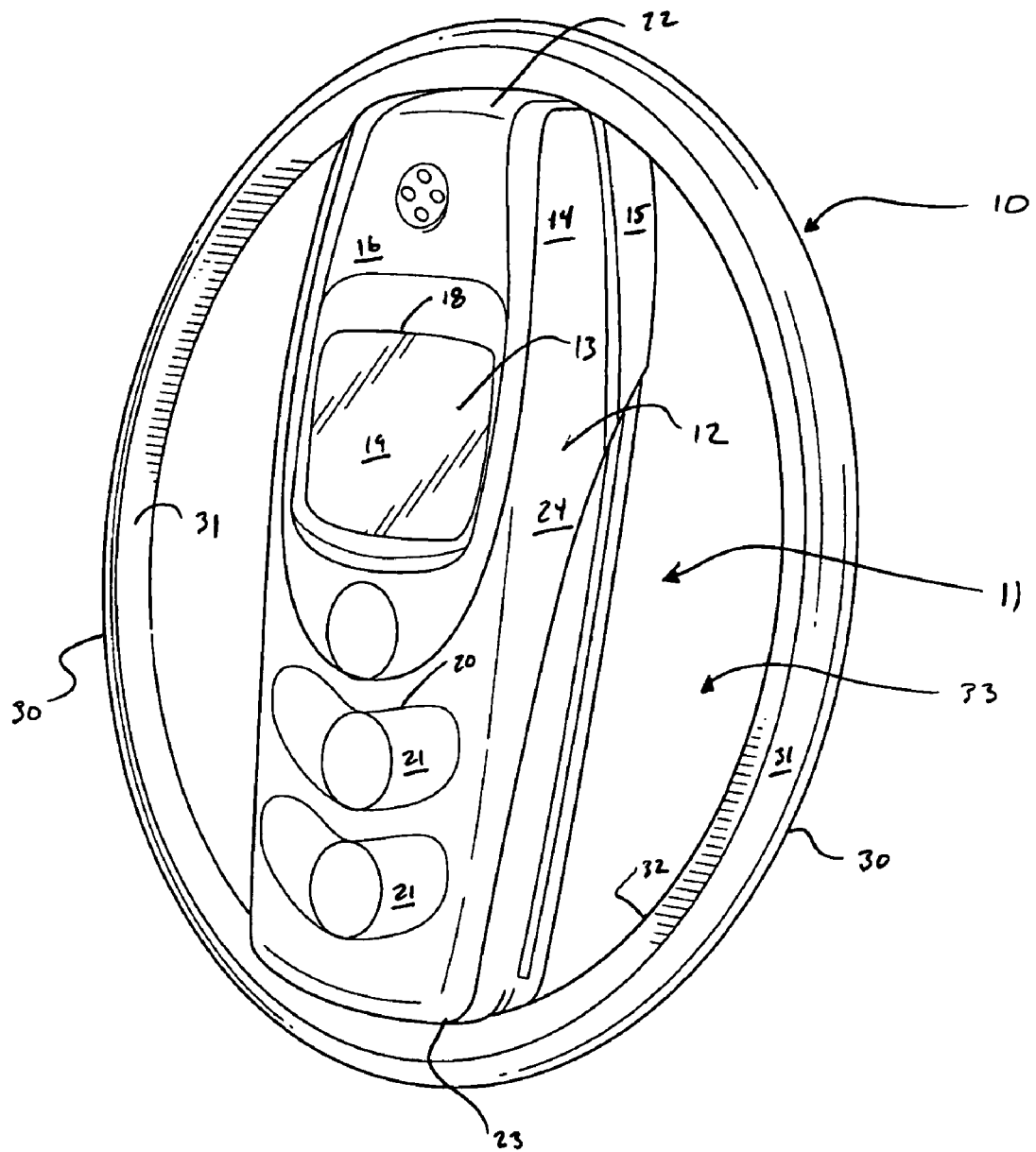
FIG. 1 is a perspective view of a mobile station and grip flange assembly of one embodiment of the present invention including a circular grip flange.

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

A grip flange 10 of one embodiment of the present invention is attached to a mobile station 11 having a housing 12 containing a wireless telecommunications signal processing assembly 13, as shown in the accompanying Figures. It should be understood, that the mobile telephone illustrated and hereinafter described is merely illustrative of one type of mobile station that would benefit from the present invention and, therefore, should not be taken to limit the scope of the present invention.

For example, other types of mobile stations, such as portable digital assistants (PDAs), pagers, laptop computers and other types of voice and text communications systems, can readily employ the present invention. Moreover, the system and method of the present invention will be primarily described in conjunction with mobile communications applications. But the system and method of the present invention can be utilized in conjunction with a variety of other applications, both in the mobile communications industries and outside of the mobile communications industries.

The housing of the mobile station 11 includes a face cover 14 and a back cover 15 which together form the housing for the remaining portions of the mobile station 11. Although the face cover 14 may be constructed in various manners, the face cover illustrated in the Figures has a roughly rectangular shape with relatively thin walls formed of a plastic material. Also, the face cover typically defines a plurality of openings for input and output devices. For example, the illustrated face cover 14 has a planar face portion 16 that defines a display opening 18 sized to extend around the periphery of a display 19. Also defined in the planar face portion are key openings 20 through which a plurality of keys 21 extend to allow access by a user.

The back cover 15 mates with the face cover 14 and supports the display 19, the keys 21 and other conventionally known components (battery, microphone, processor, etc.) necessary for the mobile station to receive, process and generate wireless communications signals. Collectively, these components are referred to herein as the wireless telecommunications signal processing assembly which, being known to those of skill in the art, are not described in greater detail herein.

Both the face and back covers 14 and 15 are preferably constructed of a relatively hard plastic material that is both light weight and protective. In addition, the housing is not necessarily limited to a collection of covers or any particular shape, material or configuration as long as the remaining components of the mobile station 11 are held together in a manner sufficient to operate.

Once assembled, the housing of the mobile station 11 includes a pair of opposite end surfaces or ends 22, 23 at the top and bottom (using the illustrated orientation) of the mobile station, as shown, for example, in FIG. 1. In addition, a pair of opposite side surfaces or sides 24 are formed upon assembly of the housing that extend between the top and bottom ends 22, 23. In the illustrated mobile station, the ends 22, 23 and sides 24 of the housing include portions of both the face and back covers 14, 15.

Generally, the grip flange 10 of the present invention includes a peripheral edge 30 extending around a body 31 wherein at least one portion of the body is attached to the mobile station 11 and extends generally outwardly therefrom. In this manner, the peripheral edge 30 and body 31 define a hand-grippable surface or plurality of surfaces that extend from, and allow for easy manual handling and transport of, the mobile station, hence the use of the term "grip flange." In addition, the grip flange may provide the opportunity to customize the appearance of the mobile station when different grip flanges are used interchangeably with the same mobile station.

It should be noted that the grip flange 10 of the present invention may be constructed of different materials and may have varying shapes (such as circular, square, or irregular shapes, as will be shown by the exemplary embodiments described below) as long as the grip flange includes a body 31 having a portion attachable to some type of mobile station 11 and an outer, peripheral surface or edge 30 extending around a portion of the body 31 and the mobile station housed therein.

Figure 2:
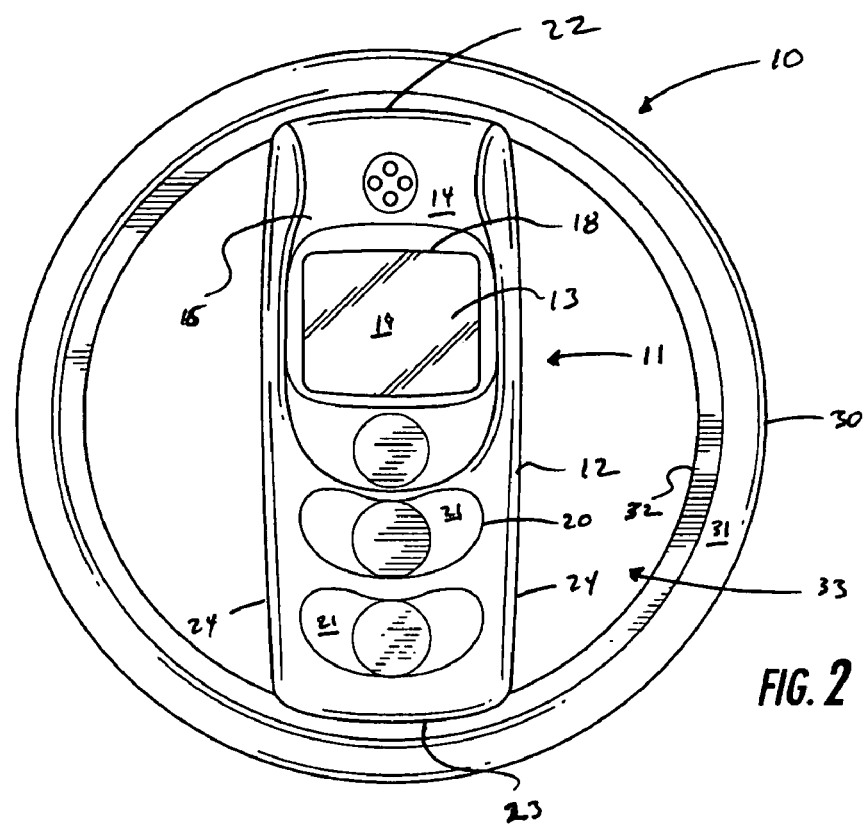
FIG. 2 is a front elevation view of the assembly of FIG. 1.
Figure 3:
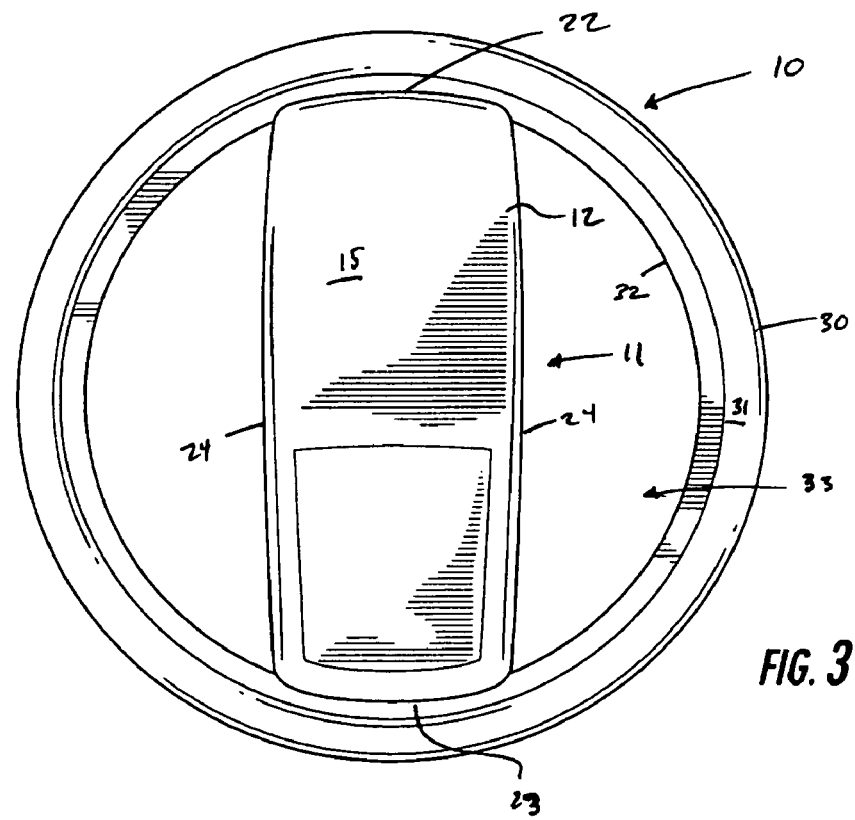
FIG. 3 is a rear elevation view of the assembly of FIG. 1.
Figure 4:
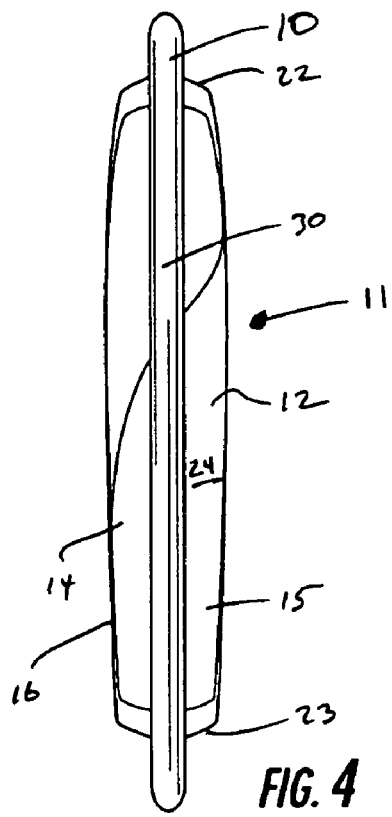
FIG. 4 is a side elevation view of the assembly of FIG. 1.
Figure 5:
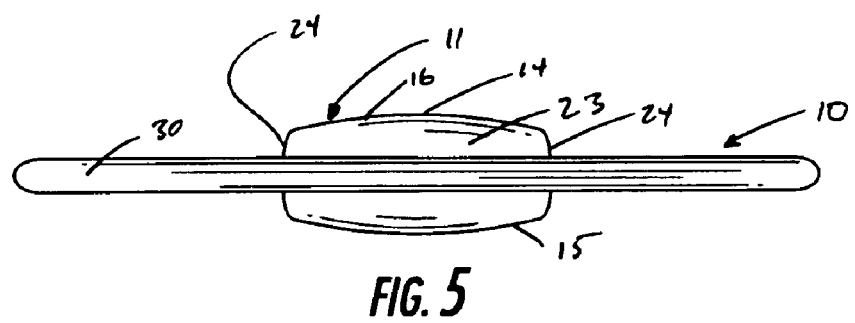
FIG. 5 is a bottom plan view of the assembly of FIG. 1.
Figure 6:
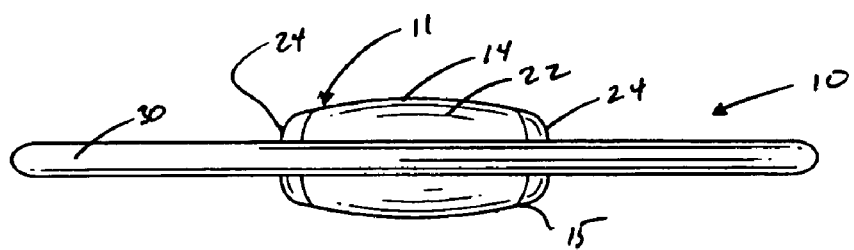
FIG. 6 is a top plan view of the assembly of FIG. 1.
Figure 7:
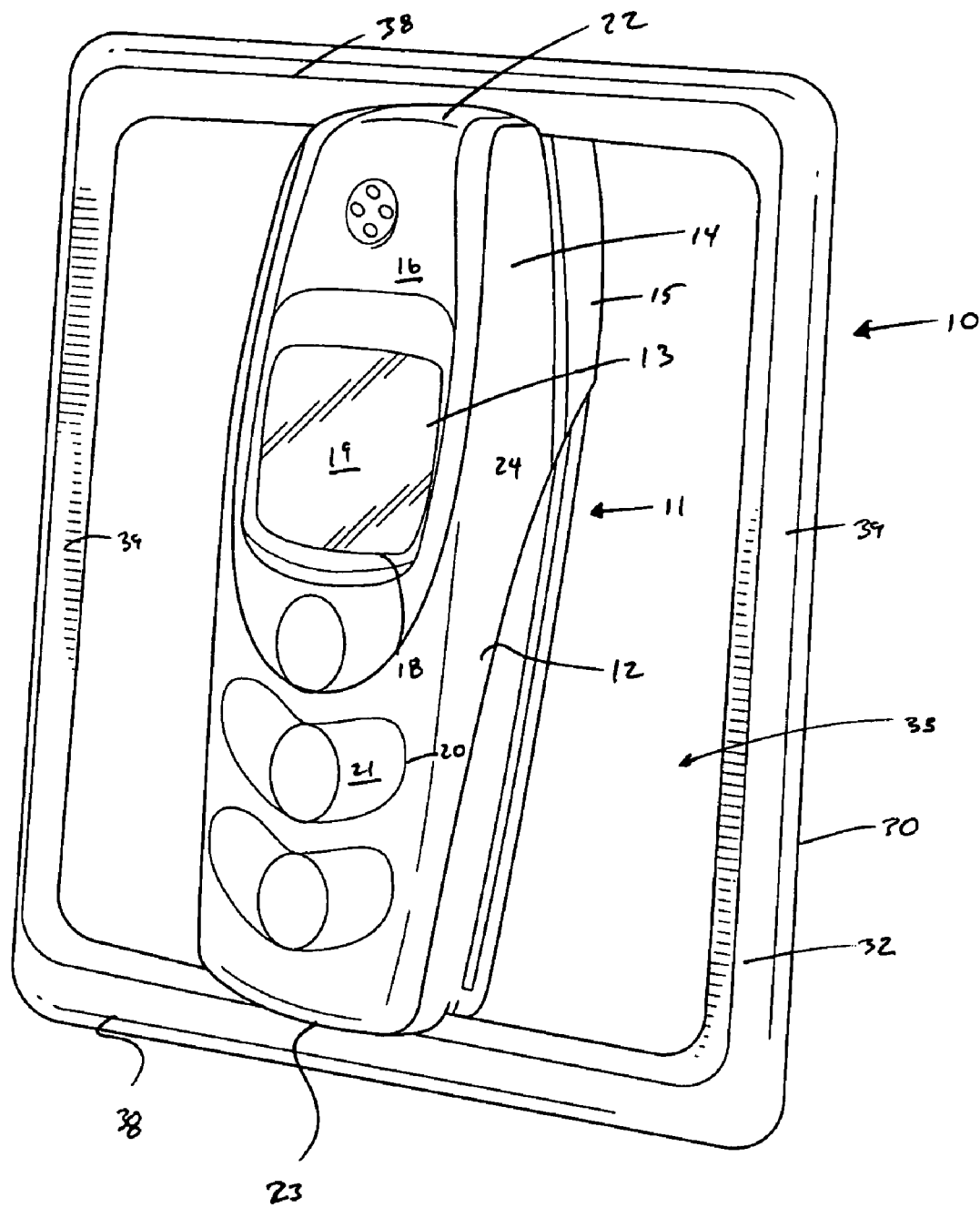
FIG. 7 is a perspective view of a mobile station and grip flange assembly of another embodiment of the present invention including a square grip flange.
Figure 8:
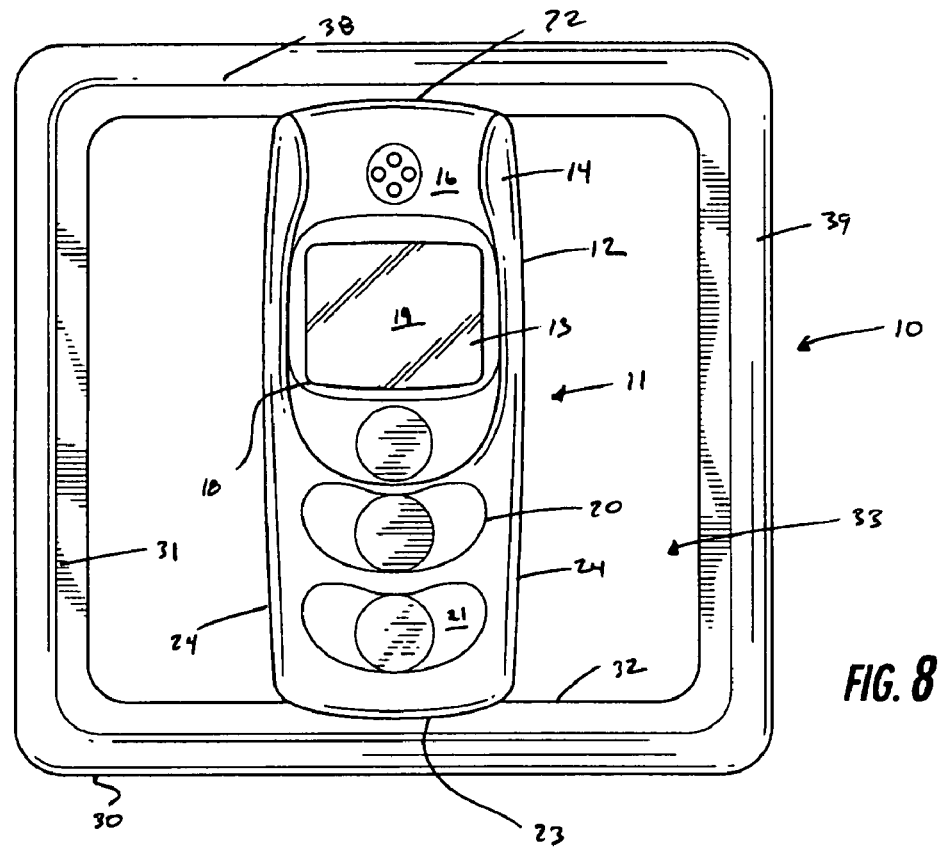
FIG. 8 is a front elevation view of the assembly of FIG. 7.
Figure 9:
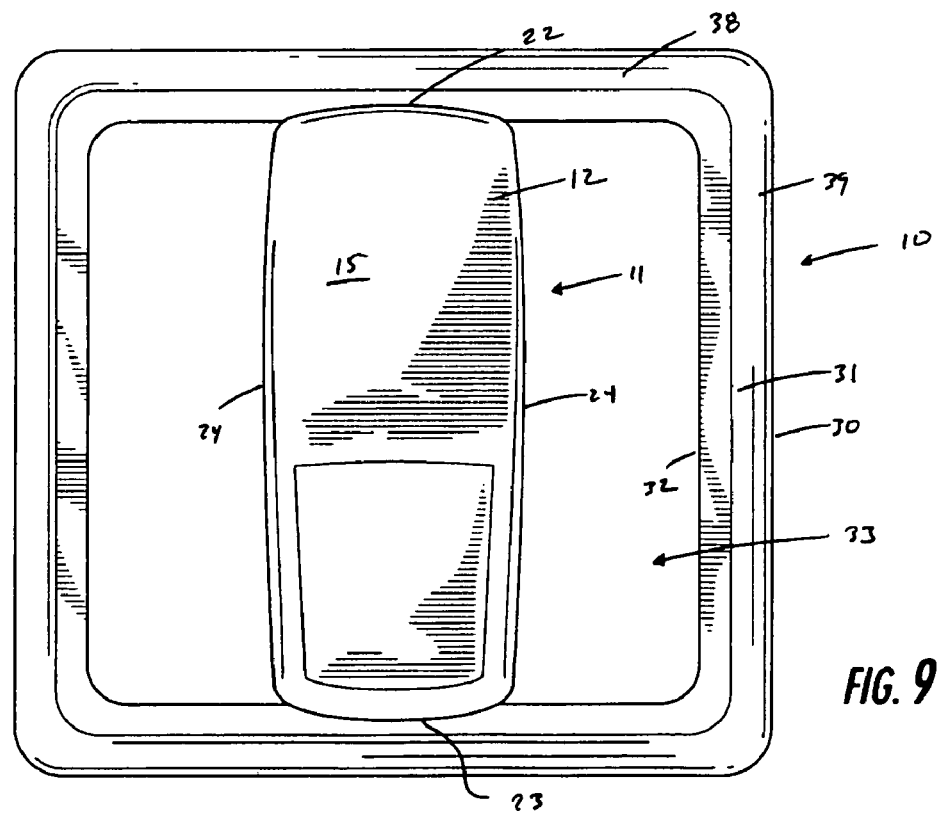
FIG. 9 is a rear elevation view of the assembly of FIG. 7.
Figure 10:
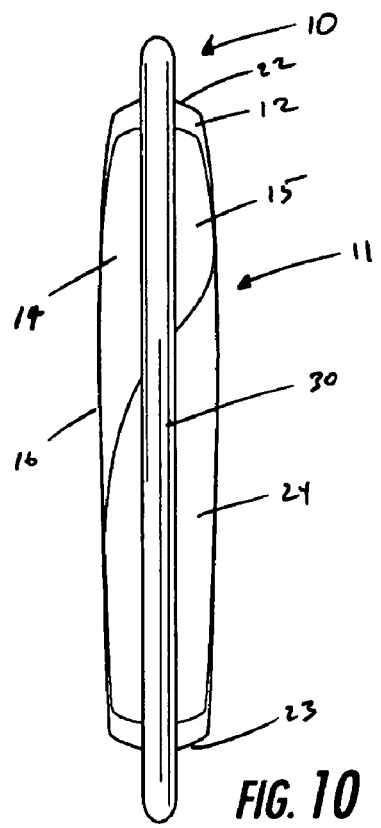
FIG. 10 is a side elevation view of the assembly of FIG. 7.
Figure 11:
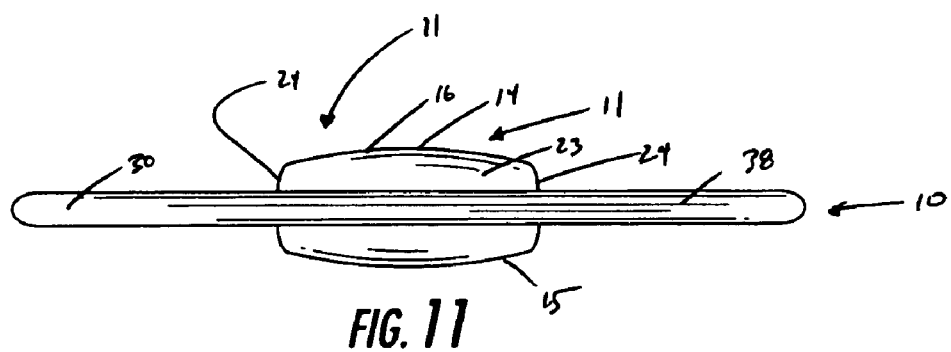
FIG. 11 is a bottom plan view of the assembly of FIG. 7.
Figure 12:
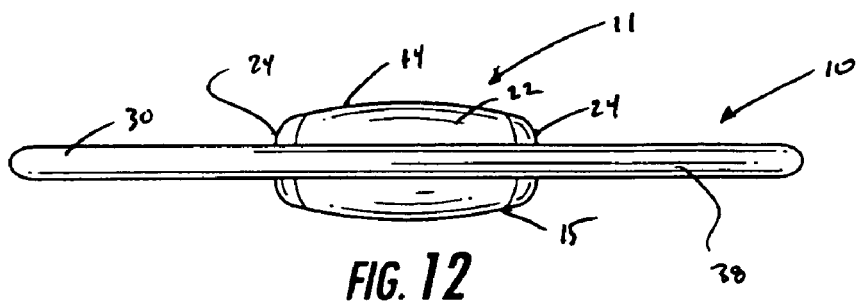
FIG. 12 is a top plan view of the assembly of FIG. 7.
Figure 13:
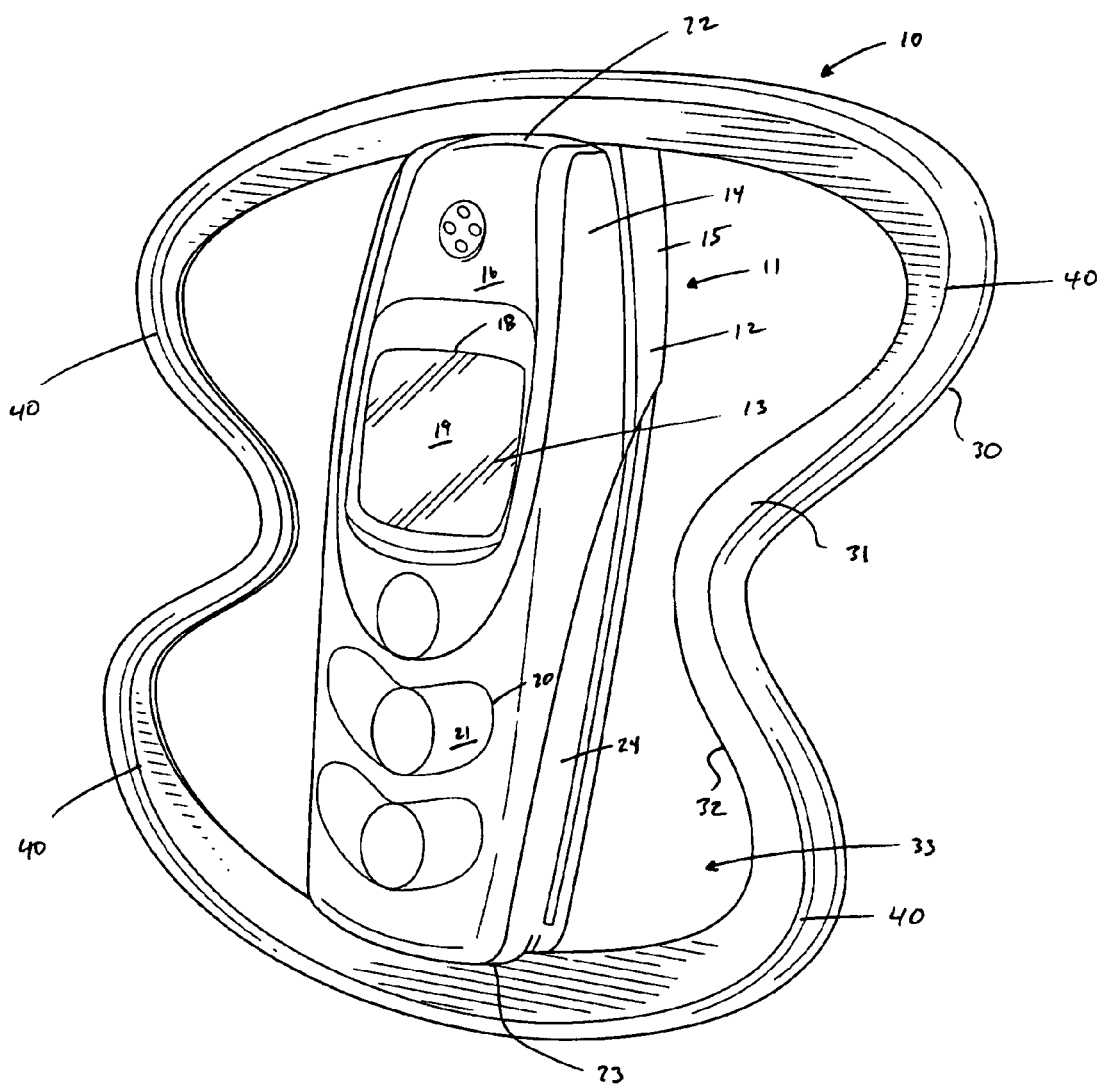
FIG. 13 is a perspective view of a mobile station and grip flange assembly of another embodiment of the present invention including an irregularly shaped grip flange having a plurality of lobes.
Figure 14:
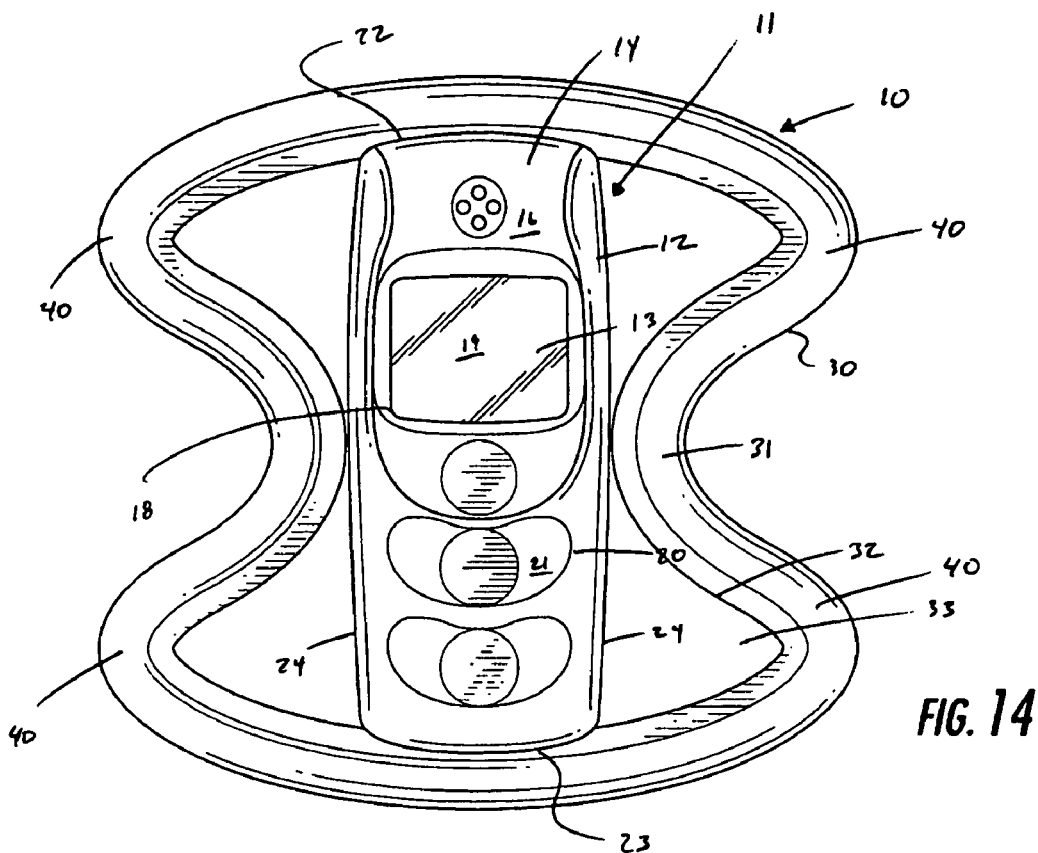
FIG. 14 is a front elevation view of the assembly of FIG. 13.
Figure 15:
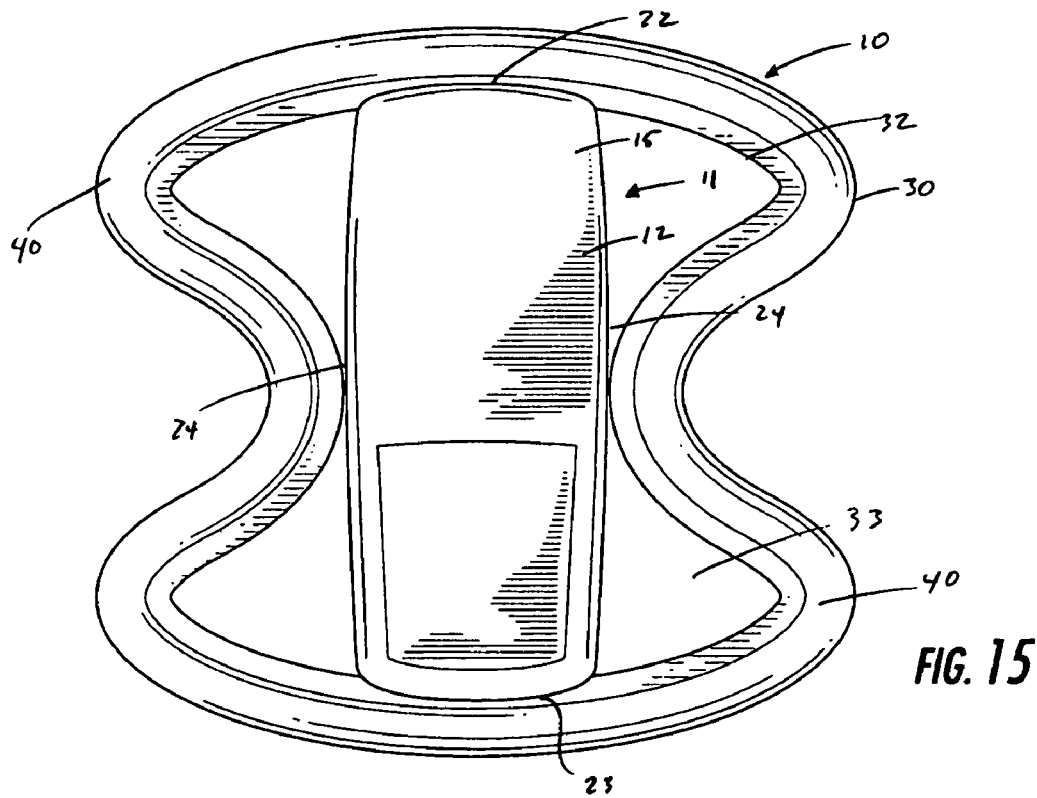
FIG. 15 is a rear elevation view of the assembly of FIG. 13.
Figure 16:
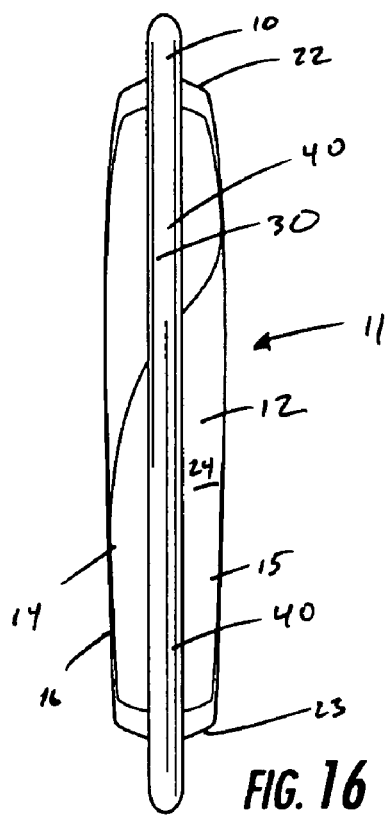
FIG. 16 is a side elevation view of the assembly of FIG. 13.
Figure 17:
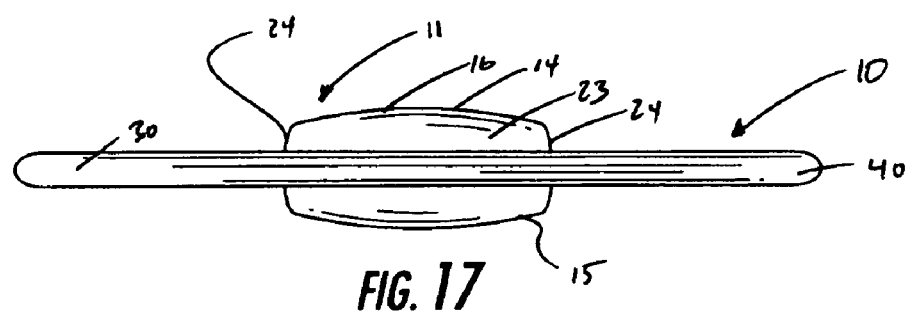
FIG. 17 is a bottom plan view of the assembly of FIG. 13.
Figure 18:
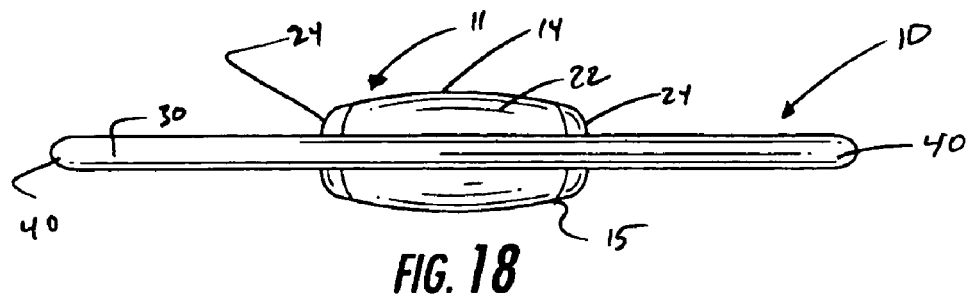
FIG. 18 is a top plan view of the assembly of FIG. 13.
Figure 19:
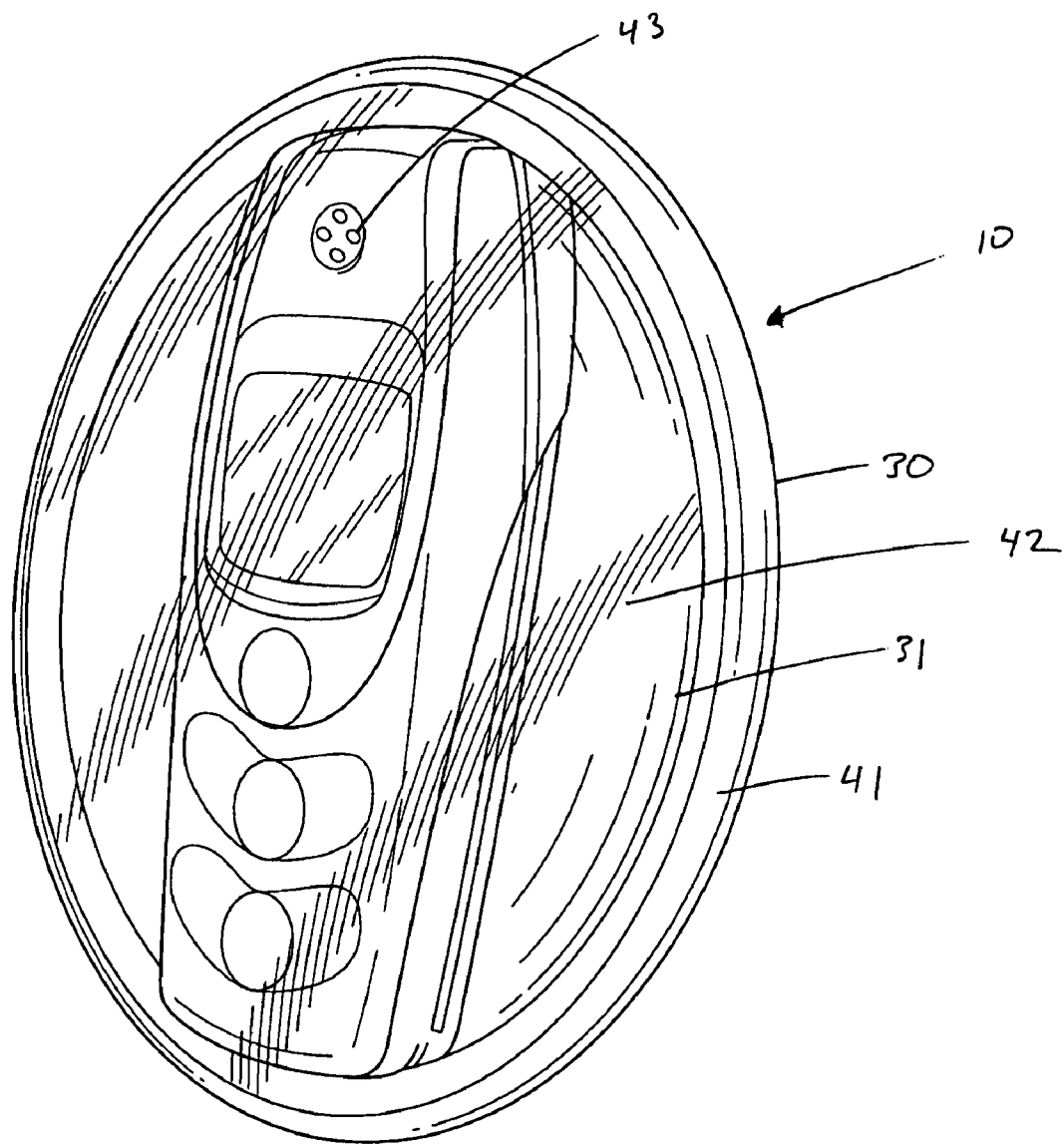
FIG. 19 is a perspective view of a mobile station and grip flange assembly of another embodiment of the present invention including a grip flange with a concave portion extending over the mobile station.
Figure 20:
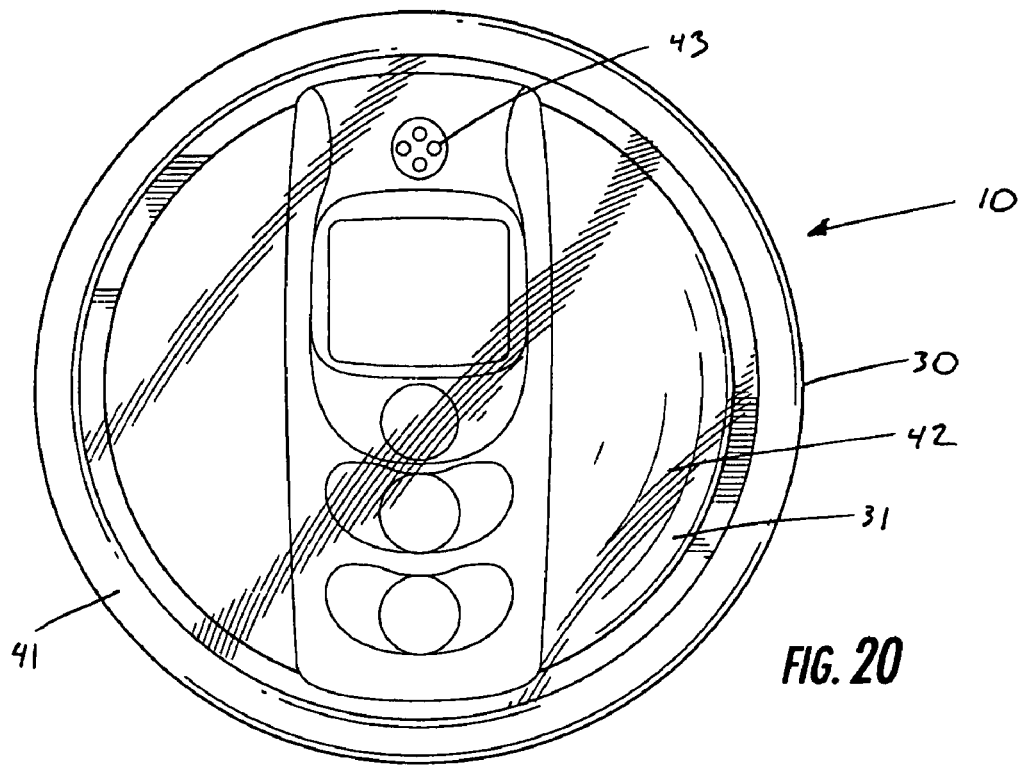
FIG. 20 is a front elevation view of the assembly of FIG. 19.
Figure 21:
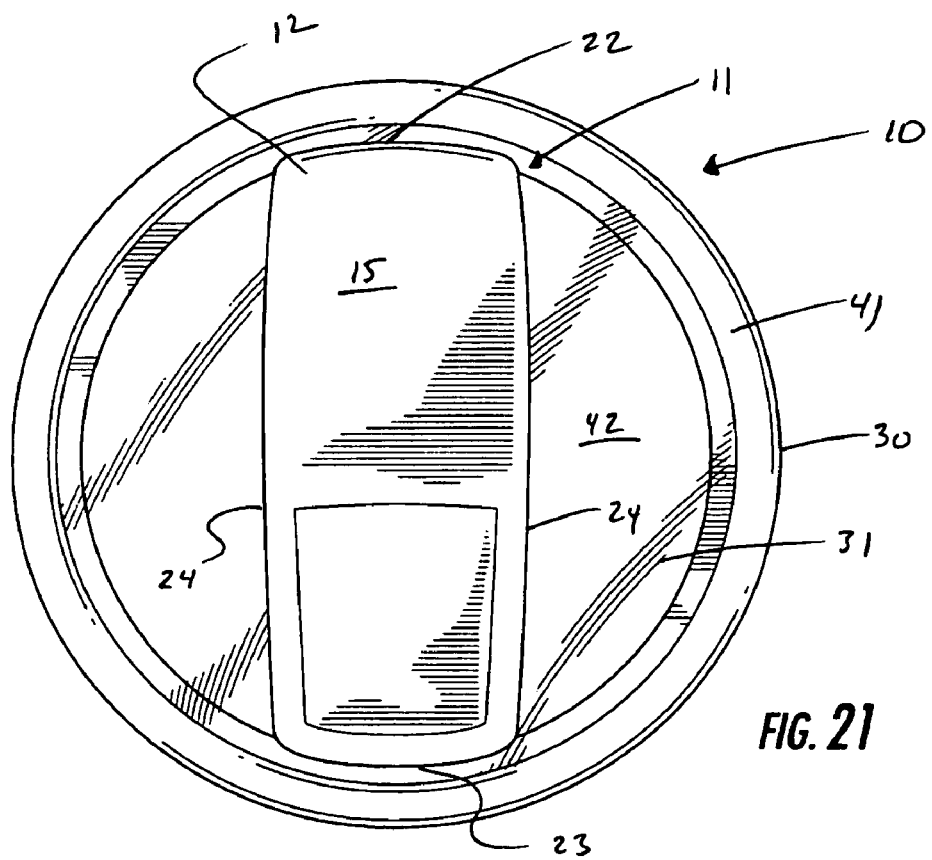
FIG. 21 is a rear elevation view of the assembly of FIG. 19.
Figure 22:
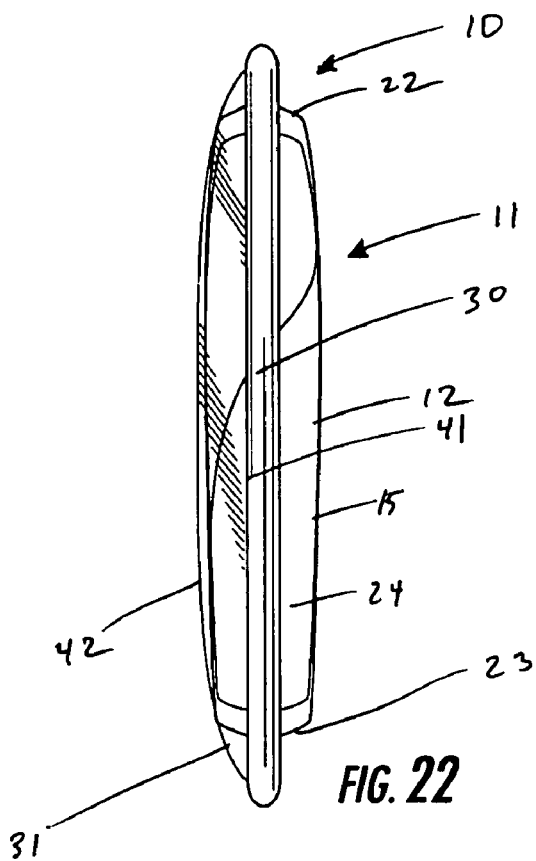
FIG. 22 is a side elevation view of the assembly of FIG. 19.
Figure 23:
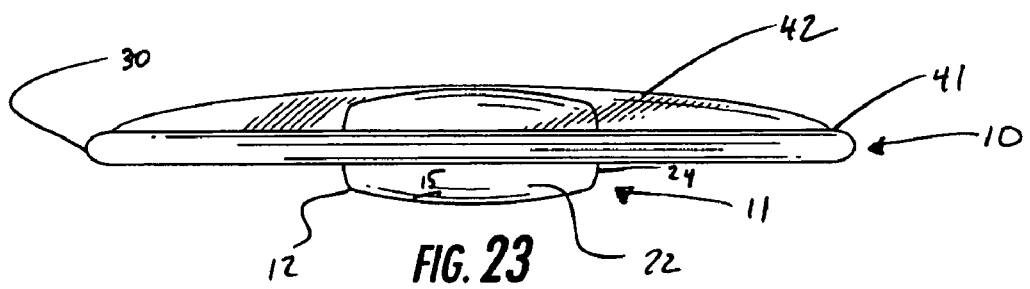
FIG. 23 is a bottom plan view of the assembly of FIG. 19.
Figure 24:
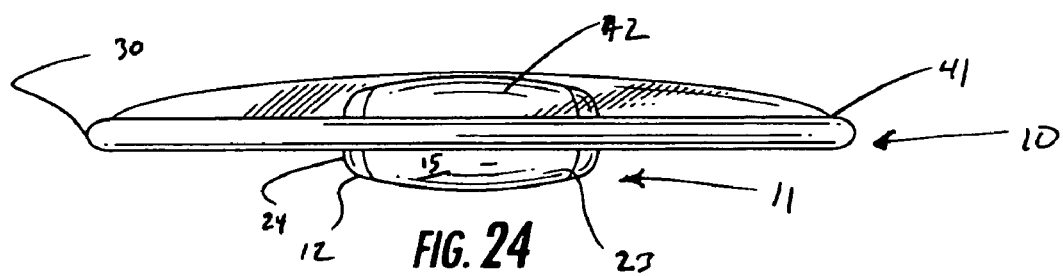
FIG. 24 is a top plan view of the assembly of FIG. 19.

An example of one embodiment of the grip flange 10 of the present invention is illustrated in FIGS. 1–6 and 25–26, wherein the grip flange includes a relatively thin, planar body 31 constructed of a flexible material and wherein the peripheral edge 30 has a circular shape and extends continuously around the body. In this embodiment, the grip flange 10 also includes an inner edge 32 that has a circular shape and extends concentrically within the outer edge. Extending between the peripheral and inner edges 30, 32 is the body 31. In this manner, the overall grip flange has a circular disc shape wherein the inner edge 32 defines a circular, central opening 33 within which the mobile station 11 can be positioned for attachment to the grip flange, as shown in FIG. 2.

In particular, the mobile station 11 can be positioned within the opening 33 so that the top and bottom ends 22, 23 of the housing are attached to opposite portions of the body 30. Such attachment may be by way of adhesive, fasteners, integral molding with the housing, etc., as long as the attachment is sufficient to support the weight of the mobile station. In another example, the grip flange 10 may be attached to the housing of the mobile station by being trapped between the face and back covers 14, 15. Such attachment is facilitated by the thinness of the body 30 and the inner edge 32 that allow the covers 14, 15 to extend over the body and inner edge without an undue gap size created between the covers. As another option, the covers may be fit so as to define a recess sized and shaped to allow passage of the respective portions of the body 30 and inner edge 32.

It should be noted that a range of cross-sectional shapes could be employed with the grip flange 10 of the present invention, including simple shapes (square, circular, rectangular, etc.) or more complex shapes. However, the above-described cross-section is advantageous in that it is flexible and strong, while at the same time being lightweight enough to allow easy transportability for the grip flange 10.

Preferably, the grip flange 10 is constructed of lightweight, resilient and flexible material that still has sufficient toughness and strength to withstand handling and support the weight of mobile station 11. For instance, materials for construction of the grip flange may include polymers such as plastics and elastomers, metals such as wire or memory metals, or combinations of various materials.

Figure 25:
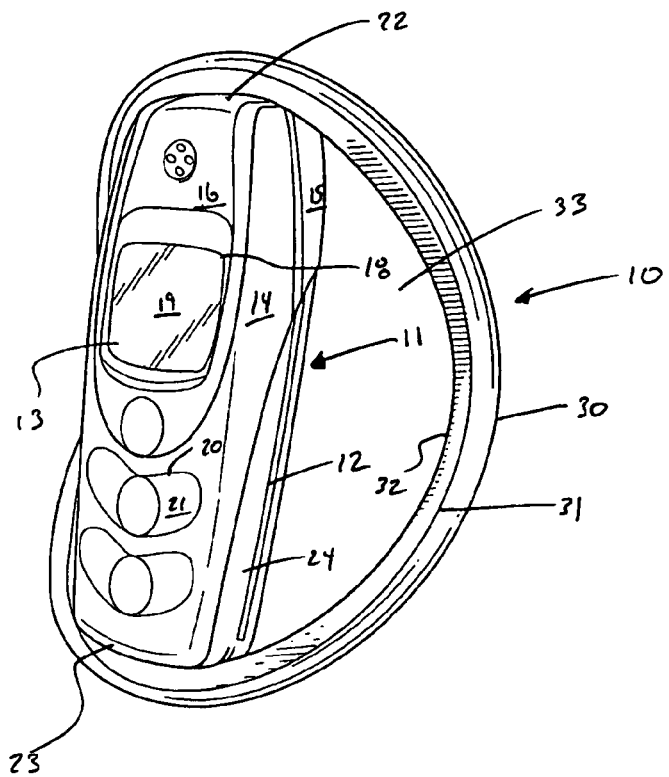
FIG. 25 is another perspective view of the assembly of FIG. 1 with free ends of the flange bent rearwards.
Figure 26:
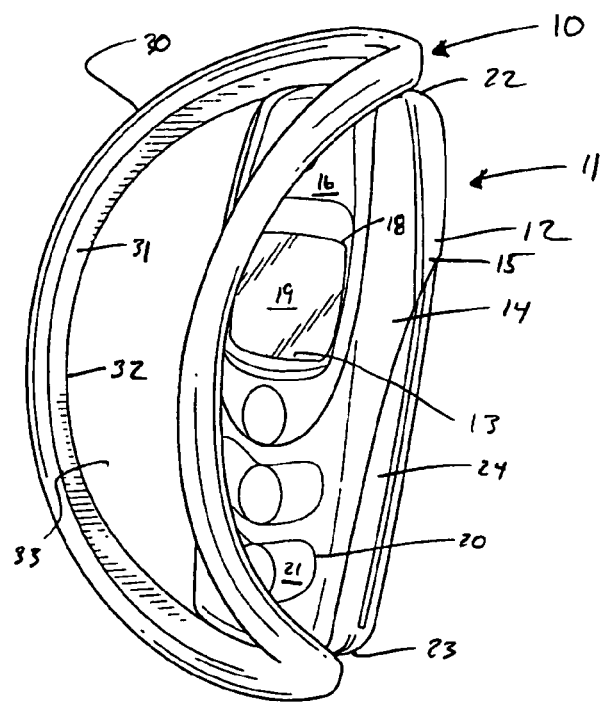
FIG. 26 is another perspective view of the assembly of FIG. 1 with free ends of the flange bent forwards.

Attachment of the ends 22, 23 of the mobile station housing to opposite portions of the body 30 defines a pair of opposing spaces 33 between opposite portions of the inner edge 32 and the sides 24 of the housing. When constructed from the above-described flexible materials, the opposing portions of the grip flange 10 (and the adjacent portions of the grip flange 10) that are not attached to the mobile station 11 may be bent towards each other, as shown in FIGS. 25 and 26. Such flexibility allows the mobile station 11 and the grip flange 10 to be carried like a handbag wherein the user loops fingers around the opposite portions that are bent towards each other. Also, the user could slip an arm, or other appendage, through the opposing spaces 33 because of their overlap when opposite portions of the grip flange 10 are bent together.

In another embodiment of the present invention, the grip flange 10 includes inner edge 32 and peripheral edges 30, but the edges have the shape of a square, as shown in FIGS. 7 through 12. Two opposite sides 38 of the square shape are attached to the top and bottom ends 22, 23 of the mobile station housing. The other pair of opposite sides 39 are spaced away from the sides 24 of the housing and define therebetween respective opposing spaces 33. Similar to the circular-shaped embodiment illustrated in FIGS. 1 through 6, the opposite, unattached portions (including the opposite sides 39) of the grip flange 10 may be bent together for ease of handling.

In yet another embodiment of the present invention, the grip flange 10 includes four lobes 40 extending laterally outwards from the sides 24 of the mobile station housing, as shown in FIGS. 13 through 18. In particular, a pair of the lobes 40 extend outwards from each of the sides 24. The pair of lobes on each of the sides 24 of the mobile station 11 are separated by an inwardly extending portion of the grip flange 10 that extends inwards towards the mobile station housing. Advantageously, the lobes 40 allow for an easy finger grip of the grip flange 10 and mobile station 11.

Another embodiment of the grip flange 10 of the present invention is shown in FIGS. 19 through 24, wherein the body 31 extends within the peripheral edge 30, and includes a planar portion 41 and a concave portion 42. The planar portion 41 extends along the peripheral edge 30 and encircles the connected portion of the mobile station 11. The concave portion 42 is relatively non-planar, having concave and convex opposite surfaces and extends convexly upwards from an inner edge of the planar portion.

Preferably, the concave portion 42 of the body 31 is shaped to be in overlying contact with one or more surfaces of the housing of the mobile station 11. As is shown by way of example in FIG. 23, the concave portion 42 extends over part of the top and bottom ends 22, 23 and the planar face portion 16 of the housing. The planar portion 41 of the body 31 is attached to the mobile station 11 at the top and bottom ends 22, 23, such as in a manner similar to the embodiments described above. In addition, or alternatively, the concave portion 42 may be attached to the respective underlying surfaces of the mobile station 11. Further, the concave portion 42 may define a plurality of acoustical vents 43 so as to facilitate the passage of sound.

Preferred materials for constructing the planar portion 41 are generally similar to those described for the embodiments above, while the concave portion 42 is preferably constructed of a partially transparent material that is generally more elastic than the planar portion. As an example, the concave portion 42 can be constructed of a relatively transparent, elastomeric membrane material. Transparency allows the user to see the underlying keys 21 and display 19, while increased elasticity allows the user to more easily press the underlying keys 21. Another use of the elastic membrane for the concave portion 42 is to allow the entire grip flange 10 to be an acoustic amplifying diaphragm for amplifying the sounds generated by the mobile station 11.

It should be noted that although each of the above-illustrated embodiments shows the mobile station as having top and bottom ends 22, 23 of the housing attached to opposite portions of the body 30, other orientations and extents of attachment are possible and still within the scope of the present invention. For instance, only a single end of the mobile station could be attached to the body 31 within the peripheral edge 30. As another example, the mobile station 11 is attached to the body 31 at its midsection and the ends 22, 23 are free.

The grip flange 10 and mobile station 11 assembly of the present invention has many advantages. For instance, the grip flange 10 provides a surface that extends around the mobile station 11 and allows for easy gripping, impact protection, tethering to clothing or tossing and catching the mobile station. Additionally, the flexibility of the grip flange 10 allows it to be bent into different shapes, such as an armband or handbag style grip. The optional concave portion 42 provides even further gripping surface and also may allow the assembly to float, imbue the it with aerodynamic properties or amplify sounds. Further, the grip flange 10 is easily exchangeable with other grip flanges having different colors and shapes for customization of the mobile station 11.

Many modifications and other embodiments of the invention set forth herein will come to mind to one skilled in the art to which the invention pertain having the benefit of the teachings presented in the foregoing descriptions and the associated drawings. Therefore, it is to be understood that the -- are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A grip flange for use with a mobile station having a wireless telecommunications signal processing assembly contained in a housing, said grip flange comprising:
   a body having at least one portion configured for attachment to the housing of the mobile station; and
   a peripheral edge extending at least partially around the body and having a thickness less than that of the mobile station;
   wherein the at least one portion of the body configured for attachment to the housing of the mobile station is capable of being sufficiently secured to the mobile station to allow the mobile station to be carried by gripping the peripheral edge.

2. A grip flange of claim 1, further comprising an inner edge defining an opening positioned within the peripheral edge, wherein the housing is positioned within the opening.

3. A grip flange of claim 2, wherein portions of the inner edge of the grip flange are attached to two opposite surfaces of the housing.

4. A grip flange of claim 3, wherein a pair of opposite portions of the inner edge of the grip flange are spaced from the housing so that the opening defined by the inner edge is divided into two portions separated by the housing.

5. A grip flange of claim 4, wherein the grip flange is constructed of a flexible material allowing the opposite portions of the inner edge spaced from the housing to be bent towards each other.

6. A grip flange of claim 5, wherein the opposite surfaces of the housing each define a seam and wherein the inner edge portions attached to the opposite surfaces of the housing are held within the seam.

7. A grip flange of claim 6, wherein the inner edge and peripheral edge are circular.

8. A grip flange of claim 6, wherein the inner edge and peripheral edge are square.

9. A grip flange of claim 1, wherein the body extends within the peripheral edge.

10. A grip flange of claim 9, wherein the body overlies a surface of the housing.

11. A grip flange of claim 10, wherein the body is constructed of a membranous material.

12. A grip flange of claim 11, wherein the membranous material is capable of transmitting sound.

13. A method of accessorizing a mobile station, said method comprising:
    providing a grip flange having a peripheral edge extending at least partially around a body and having a thickness less than that of the mobile station;
    positioning a housing containing a wireless telecommunications signal processing assembly within the peripheral edge; and
    attaching at least one portion of the body to the housing.

14. A method of claim 13, wherein positioning the housing includes positioning the housing within an opening defined by an inner edge of the grip flange.

15. A method of claim 14, wherein attaching the grip flange to the housing includes attaching portions of the inner edge of the grip flange to two opposite surfaces of the housing.

16. A method of claim 15, wherein positioning the housing includes positioning the housing within the opening so that two opposite portions of the inner edge are spaced from the housing and the opening is divided by the housing into two portions.

17. A method of claim 16, further comprising bending the opposite portions of the inner edge of the grip flange towards each other after attaching the grip flange.

18. A method of claim 17, further comprising sliding an appendage through the two portions of the opening defined between the housing and the grip flange after bending the opposite portions of the inner edge towards each other.

19. A method of claim 17, further comprising gripping the opposite portions of the inner edge in a single hand after bending the opposite portions towards each other.

20. A method of claim 13, wherein attaching the portion of the flange includes separating two components of the housing, inserting the portion of the flange between the components and reattaching the components with the portion of the flange therebetween.

21. A method of claim 13, wherein positioning the housing further includes positioning a surface of the housing against the body of the grip flange which extends within the peripheral edge.

* * * * *